(12) United States Patent
Siemers et al.

(10) Patent No.: US 7,352,205 B2
(45) Date of Patent: Apr. 1, 2008

(54) RECONFIGURABLE SWITCHING DEVICE PARALLEL CALCULATION OF ANY PARTICULAR ALGORITHMS

(75) Inventors: Christian Siemers, Wolfsburg (DE); Christian Wiegand, Clausthal (DE)

(73) Assignee: SIEMENS Aktiengesellschaft, Munich (DE)

( * ) Notice: Subject to any disclaimer, the term of this patent is extended or adjusted under 35 U.S.C. 154(b) by 0 days.

(21) Appl. No.: 10/588,860

(22) PCT Filed: Feb. 7, 2005

(86) PCT No.: PCT/EP2005/050500

§ 371 (c)(1),
(2), (4) Date: Aug. 9, 2006

(87) PCT Pub. No.: WO2005/078599

PCT Pub. Date: Aug. 25, 2005

(65) Prior Publication Data

US 2007/0171101 A1 Jul. 26, 2007

(30) Foreign Application Priority Data

Feb. 13, 2004 (DE) ............ 10 2004 007 232

(51) Int. Cl.
*H03K 19/173* (2006.01)
(52) U.S. Cl. .......................... 326/38; 326/40
(58) Field of Classification Search ............ 326/37–41, 326/47
See application file for complete search history.

(56) References Cited

U.S. PATENT DOCUMENTS

2002/0002573 A1* 1/2002 Landers et al. ............. 708/501

FOREIGN PATENT DOCUMENTS

| DE | 198 43 640 | 3/2000 |
|---|---|---|
| DE | 103 47 975 | 3/2004 |

OTHER PUBLICATIONS

Rechenberg, Pomberger: "Informatik-Hanbuch, 3. Auflage", 2002, Hanser, Muchen, Seite 275.
C. Wiegand, C. Siemers, H. Richter: "Definition of a Configurable Architecutre for Implementation of Global Cellular Automation", Bd. 2981, Feb. 2004, Seiten 140-155.
L. Jozwiak, et al: "Effective and efficient FPGA synthesis through general functional decomposition" Journal of Systems Architecture, Elsevier, Science Publishers BV, Amsterdam, NL, Bd. 49, No. 4-6, Sep. 2003, Seiten 247-265.
M.M. Mirsalehi, T.K. Gaylord: "Logical minimization of multilevel coded functions", Applied Optics, Bd. 25, No. 18, Sep. 1986, Seiten 3078-3088.
R. Hoffmann, K.O. Volkmann, W. Heenes: "Globaler Zellularautomat (GCA): Ein neues massivparalleles Berechnungsmodell" Pars Workshop, Oktober 2001.
R. Hoffmann et al: "GCA: a massively parallel model", Parallel and distributed processing symposium, 2003. Proceedings international, Apr. 2003, Piscataway, NJ, USA, Seiten 270-276.
Macias, N.J.: Ring around the PIG: a parallel GA with only local interactions coupled with a self-reconfigurable hardware platform to implement an O(1) evolutionary cycle for evolvable hardware, IEEE-A1, vol. 2, 1999.
Macias, N.J.: The PIG paradigm: the design and use of a massively parallel fine grained self-reconfigurable infinitely scalable architecture, IEEE-A1, pp. 175-180, 1999.

* cited by examiner

*Primary Examiner*—James H. Cho
(74) *Attorney, Agent, or Firm*—Young & Thompson

(57) ABSTRACT

A configurable architecture of a calculation device includes at least one individual configurable and/or reconfigurable switching device, whereby the output variables thereof form a time point $t_{n-1}$ and the input variables of the switching device form a time point $t_n$. Elements are provided in order to control the output variables in a clocked manner and to store the output variables of the switching device between the time points $t_{n-1}$ and $t_n$.

8 Claims, 7 Drawing Sheets

RECONFIGURABLE SWITCHING DEVICE PARALLEL CALCULATION OF ANY PARTICULAR ALGORITHMS

1. INTRODUCTION

The present invention relates to an architecture for a computer device for parallel calculation of algorithms with at least one sequential circuit.

2. PRIOR ART

2.1 Known Computer Models

Figure 1:
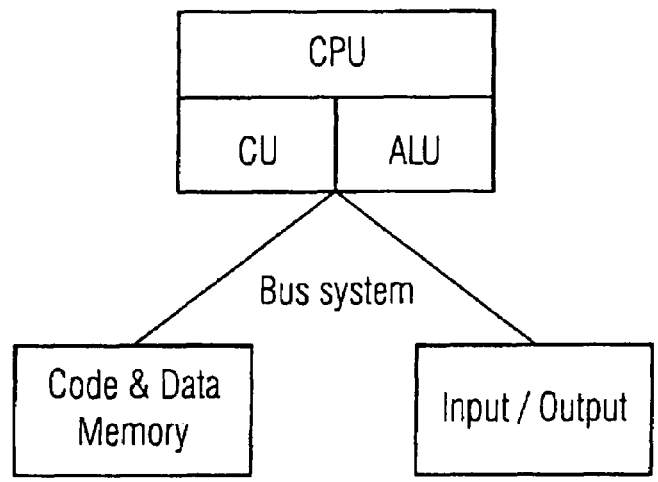

In general, what is known as 'Von Neumann architecture', as shown in the basic illustration in FIG. 1, is regarded as a universal computer device. This is to be understood to mean that a computer can be used, on the basis of this architecture with the components central processing unit [CPU, containing control unit (CU) and arithmetic and logic unit (ALU)], memory, input/output and bus system, to calculate all algorithmizable problems in principle. A computer of this kind is set for the respective problem by a program, i.e. a textual description of the algorithm, e.g. in the programming languages C, C++ or Java. This program is translated into a machine-readable program by a translator (compiler), itself a program.

Program execution in the computers based on the Von Neumann architecture shown in FIG. 1 and on similar architectures (e.g. a Harvard or modified Harvard architecture) takes place sequentially in principle. This is to be understood to mean that the algorithm, comprising a set of machine instructions, is executed by virtue of the first instruction being known. Either the instruction following a command is the one at the next address in the memory (normal program flow) or the last executed instruction was a jump command which moves the current program position to another location. The internal register storing the current program position is called the "program counter" (PC).

This principle of sequential processing means that at any time precisely one instruction is being processed. This is called the Von Neumann principle. Although modern architectures, which are called RISC (Reduced Instruction Set Computing), superscalar or VLIW (Very Long Instruction Word), execute more than one instruction at a time, the principle of sequentiality is retained. Overall, this execution principle is called "time sequential" (Computing In Time), which indicates that the algorithm requires time.

Figure 2:
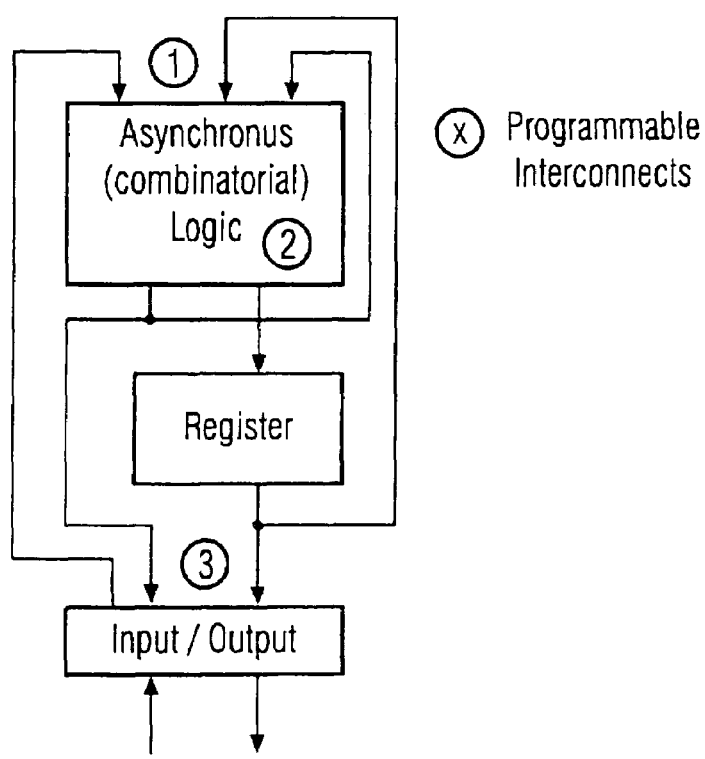

An entirely different principle of program execution is provided in programmable logic chips [PLDs (Programmable Logic Devices), in line with FIG. 2] or their best known implementation, FPGAs (Field Programmable Gate Arrays). This architecture is also universal, i.e. can be used for any algorithmizable problem. In this context, programming is carried out such that elementary processors, usually defined at bit level and therefore called logic elements, are connected up in a network. This form of programming is usually called "configuration".

The program execution in a PLD takes place with maximum parallelism, in contrast with the Von Neumann principle. The entire configuration of a chip can be regarded as a single instruction—but in contrast with the Von Neumann principle not with a fixed definition, rather composite—which is processed fully in one cycle. The cycle time, frequently linked to an external clock, is then dependent on the complexity of the composition. As a result, a lower clock rate in comparison with processors is used which is more than compensated for by the parallelism of the execution, however. This principle of execution is called "Computing In Space".

2.2 Deterministic Finite Automata

One of the fundamental models for algorithmizing problems is deterministic finite automata (DFAs). These are also called "Finite State Machines" (FSMs in line with the basic illustration shown in FIG. 3) in engineering. This model considers the problem as a series of states with defined transition functions (next state decoder) between them, on the basis of the input values. Although the model of the DEA is theoretically not as powerful as that of the Von Neumann model, it is possible in practice to solve any desired problems, if appropriate with an addition in the model.

The greatest problem of these DEAs is that their functions grow exponentially with the number of states, in relation to the space requirement for semiconductor material (particularly silicon). For this reason, it is popular to choose models which comprise a large number of machines communicating with one another. A computer model of this kind is called a "complex, cooperating machine".

2.3 Representation of Boolean Functions

A Boolean function or logic function is a depiction $f:B^m \to B^n$, where $B=\{0,1\}$, which can be represented in the form $f=(f_1, f_2, \ldots f_n)$, that is to say as a vector of functions $f_k:B^m \to B$. The text below therefore assumes only functions $f_k$ with a starting value: these are denoted generally as f.

It is also known that f can be represented in the form of a disjunctive or conjunctive normal form. For the disjunctive normal form, this means that $$f=z_i+z_2 \ldots +z_k, \text{ where } k=1, 2, \ldots, 2m \text{ and '+' is an OR operator (logic OR)} \quad (1)$$

and $$z_1=y_1*y_2* \ldots y_n, \text{ where } i=1, 2, \ldots, k \text{ and '*' is an AND operator (logic AND)} \quad (2).$$

Naturally only those zi are used for which the function to be described is given the value TRUE or '1'. In this case, the term yj determines how an input bit $i_k$ is to be produced from the input vector $x=(i_1, i_2, \ldots, i_k)$. Whereas only values from the set $\{0, 1\}$ are permitted for the input bits, this needs to be changed for yj: these values are assigned one of the three attributes $\{0, 1, -\}$. In this case, the attribute '1' for yj means that $i_k$ is taken unchanged, '0' means that $i_k$ needs to be chosen in inverted form (noted as $/i_k$), and '−' stands for don't care; i.e. $i_k$ is not used. If only the values $\{0, 1\}$ are used as attributes for yj, this is referred to as 'canonic disjunctive normal form'.

This representation is significant because it means that when the order of the input bits is known the subexpressions zi based on the above equation (2), also called "terms", can be represented as "string terms": with an order i1, i2, i3, "111" means that $z1=i1*i2*i3$, "0-1" stands for $z2=/i1*i3$ etc.

With three input bits, the set of all possible input vectors is $v=\{000,001,010,011,100,101,110,111\}$. If, by way of example, the function f is given the value TRUE only on the input vector $\{001,011,111\}$, only these actually need or are permitted to be indicated; in the form of string terms this can be done by 111 and 0-1, this completely characterizes the given function and is isomorphic relative to the disjunctive normal form $$f=/i1*i3+i1*i2*i3$$

2.4 Content-Addressable Memory (CAM)

Read/write memory elements [RAM (Random Addressable Read/Write Memory)] are usually used for storing data and programs. In this case, an address is present on the address bus, and when a chip-specific waiting time has elapsed the stored data item is present on the data bus during the read operation and can be used further. The write operation operates accordingly.

From the point of view of the entity which wishes to receive the data (e.g. a processor), the address is known and the stored content is previously unknown. However, there are applications in which the circumstance is exactly the opposite: the stored content is known, and the interest is the address at which this content is stored, the response also being able to be "not present". Memory elements which support this kind of check are called "content addressable memories" [CAMs (content-addressable memory elements)].

Memory elements which are called CAMs and directly support this behavior are considered to be special chips and are in no way to be found often. For practical applications, however, it is possible to emulate the functionality of CAM using ordinary RAM chips. To this end, for all data which would be stored in the CAM directly but, in the event of a check, do not give the value but rather the memory address, it is necessary to calculate the corresponding addresses in advance and to store them at the RAM address which corresponds to the data item.

2.5 Cellular Automata

Cellular automata (CAs) are a set of finite machines which are arranged in an array with a fixed topology and have further properties (cf. literature citations [1] and [4]). This set of FSMs is arranged as an n-dimensional array (usually n=2), with each slot being given fixed coordinates. Each FSM has distinct neighbors with whom it is possible to communicate. In the case of n=2, the four surrounding FSMs (at the "points of the compass" N, E, W, S, hence also called a "NEWS neighborhood") are usually regarded as neighbors.

The communication with the neighbors is such that the states of the direct neighbors can be read and hence evaluated. In each time step, the state of all the cells is calculated in parallel. If data from cells which are further away are to be used for calculating a new state, these data need to be transported from cell to cell in steps. This means that classical cellular automata are well suited to calculating problem definitions with a high level of locality for the data.

CAs are considered to be universal computers like the previously discussed architectures; they also operate entirely in parallel. If a network of CAs is intended to be mapped into a hardware circuit, e.g. an ASIC or else PLD, then the number of connections increases linearly with the number of machines. The connections themselves are only relatively short and are laid permanently, depending on the chosen topology. The expense for communication among the CAs is therefore relatively low. If the complexity of a logic function is considered to be the memory requirement for mapping this logic function into a RAM then the maximum complexity of the logic function corresponding to the response of a cell rises exponentially with the number of input variables and linearly with the number of output variables for the function. The number of input variables is in this case the sum of all the bits which are required in order to encode the states of all the CAs connected to the cell, including the state of the cell itself. Hence, the maximum complexity of the cell is essentially limited by the number of connections for each machine.

The concept of global cellular automata (GCAs) overcomes the restrictions of the CAs by allowing a cell to be connected not just to its closest neighbor but rather to any desired cells in the entire array. A GCA therefore no longer has a fixed topology but rather allows the use of a topology which is matched to the problem definition and possibly even changes at the time at which the calculation is being performed. This can result in significant acceleration in the program execution. The number of connections for a single machine is possibly stipulated by an upper limit. If just a single connection is permitted, reference is made to single-arm GCAs, and in the general case to k-arm GCAs.

Consequently, when implementing an array of GCAs, the expense required for communication among the cells increases greatly with the number of cells. The number of possible connections between the individual machines increases quadratically with the number thereof.

The complexity of the individual machines themselves or of the underlying logic function is dependent essentially on the number of connections for each cell, as in the case of conventional CAs. If a GCA is intended to be mapped into a reconfigurable circuit (PLD) then each individual cell, which is able to implement any logic functions, of course, must allow the maximum possible complexity.

If the individual machines are mapped onto a respective arithmetic and logic unit with a local memory, each cell can also implement complex logic functions. The expense for any communication by all cells rises quadratically with the number of cells. The granularity of the circuit is then determined by the number of cells or the bit width of the connections between the cells. A circuit of this kind can very easily implement GCAs which meet the stipulations of the circuit in terms of the number of FSMs and bit width. It is also possible to implement complex logic functions in each individual cell. However, a drawback is that GCAs which do not concur with the prescribed granularity in terms of the number and required bit width of the connections can be mapped onto the circuit only with difficulty.

If the individual cells are in the form of a combinational circuit, each cell must be able to process data from all the other cells, including its own state. For this reason, each combinational circuit must be able to implement logic functions which can contain all the binary-coded states of all the cells as input variables. The number of output variables for the logic function merely needs to allow all the state of a single cell to be binary-encoded. A drawback in this context is that the complexity of the logic function rises exponentially with the number of input variables. A similar drawback is the polynomially increasing expense for communication among the cells.

A (re)configurable architecture (PLD) suitable for holding a GCA therefore needs to be able to hold any complexity per FSM. This means that—if the FSMs are to be mapped directly into a cell of the PLD—the cells need to be able to hold any desired function. It is known that this results in exponential growth of the cell size. The configurable network in the PLD also needs to be of complete design, i.e. every cell output must be able to be connected to every other cell. The network therefore grows quadratically, as does the configuration of the network.

There are not currently any PLD architectures on the market or known which meet both requirements: large cells with a complete design space do not exist, there are only small cells with a complete design space (known as a 'look-up table structure' (LUT)] or large cells with incomplete options for mapping any desired functions. Complete connectivity in all cells is possible only in the case of large cells. Mapping GCAs onto existing PLDs is therefore difficult, and is often even impossible.

3. DEFINITION OF OBJECT

It is an object of the present invention to refine the architecture specified in the introduction 1 such that the aforementioned problems are at least diminished. In this context, the aim is particularly to demonstrate the opportunity of being able to map the GCAs, which are to be considered as a distinguished model and which can actually use the parallelism contained in the algorithm, onto a programmable piece of hardware such as a PLD. That is to say that the aim is to specify a PLD architecture which allows any desired GCA to be held.

4. APPROACH TO ACHIEVING THE OBJECT

The invention achieves said object by means of the measures specified in claim 1. Accordingly, the reconfigurable architecture of a computer device is intended to comprise at least one individually configurable and/or reconfigurable sequential circuit which
- has a first stage with inputs and is formed from a plurality of parallel-connected memory elements which can be addressed via input lines, each memory element being able to be supplied with a subset of the input variables which are attached to an associated, ascertained implicant,
- has a second stage, connected downstream of the first stage, with memory elements which can be addressed by the identifiers of the individual implicants, and
- has a third stage, connected downstream of the second stage, with outputs and with means for disjunctive logic combination of the output values from the individual implicants from the memory elements in the second stage, where output variables from at least some of the outputs at a time $t_{n-1}$ form the input variables on associated inputs of the sequential circuit at a time $t_n$ and where means are provided for clock-controlled storage of the output variables from the sequential circuit between the times $t_{n-1}$ and $t_n$. In this case, not all inputs need to be engaged by (stored) outputs; rather, there may also be free inputs. In addition, there may also be outputs which are not connected, that is to say produce an end result which is not used further, for example.

In addition, in this context the second stage, arranged between the stage with the inputs and the stage with the outputs, with memory elements is used to process data produced in the first stage and to forward processed data to the third stage.

The times $t_{n-1}$ and $t_n$ denote directly successive evaluations of the logic function. In a technically beneficial implementation, these times can be derived from an impressed clock signal with a clock period T, so that $t_n - t_{n-1} = k \cdot T$, where $k=1,2,3,\ldots$. For a given application, k is constant here, and for different applications it can be chosen to be different.

When it is certain that the complexity of the logic function is rising exponentially with the number of input variables and linearly with the number of output variables or the number of cells in the array of the GCAs which are to be depicted and the expense for communication among the GCAs is increasing at least quadratically with the number of cells, the inventive (re)configurable architecture is suitable for holding GCAs. To this end, it comprises at least one individual configurable sequential circuit whose output variables at the time $t_{n-1}$ form the input variables for the sequential circuit at the time $t_n$. Between the times $t_{n-1}$ and $t_n$, the outputs of the sequential circuit are stored in a memory, such as particularly in registers, which means that a complex sequential circuit or an FSM is produced. In this context, the individual stages in the breakdown are likewise sequential circuits; only the configuration is in individual combinational circuits in each stage, with each stage comprising a configurable combinational circuit and memory elements.

The inventive architecture accordingly contains combinational circuits as Boolean logic function units whose respective output is dependent on current values at the input of the architecture, whereas the at least one sequential circuit is to be understood to mean a Boolean logic function unit whose output is dependent on current values at the input at this time and at a finite number of preceding times. Sequential circuits are accordingly made up of combinational circuits and usually clock-edge-controlled memory elements.

Advantageous refinements of the inventive architecture can be found in the claims which are dependent on claim 1. In this case, the embodiment from claim 1 can be combined with the features of one of the subclaims or preferably also with those from a plurality of subclaims. Accordingly, the architecture may also be of the following design:
- The storage means provided may be register memory elements, these generally being clock-edge-controlled flipflop elements.
- In this case, the individual implicants can preferably be ascertained by minimization methods.
- In addition, the first stage can be logically combined with the second stage by means of at least one crossbar switch.
- The memory elements provided may advantageously be CAMs and/or RAMs.
- It is particularly advantageous that at least one GCA can be integrated.
- The memory elements provided can be magnetoresistive components, particularly of the TMR type. Appropriate tunnel magnetoresistive elements are known per se.

In this context, a memory element is understood to mean the architecture of any internal element which is made up generally from few transistors or comparable chips and from the actual elements which allow the memory function, such as the aforementioned magnetoresistive elements (per memory unit).

The other refinements of the inventive architecture which are indicated above are based particularly on the considerations which are set out below:

Although the complexity of a logic function in the chosen sequential circuit rises linearly with the number of output variables, all the expense for the communication among the cells is removed. A large number of single machines with a small number of output variables, or a small number of GCAs with a large number of output variables, or else a mixture of various cells, can be mapped into a logic function of this kind. This means that no granularity is prescribed, and the FSMs can communicate with one another fully, in principle. However, a limit is set by the maximum complexity of the logic function which the combinational circuit can hold.

The use of a sequential circuit with a large number of inputs—this will arise in the general case when a GCA is mapped using a number of FSMs—means that again a kind of exponential dependency for the area requirement on the number of inputs may arise. The applicable upper limit is growth of the area by exp(number of states) when each state is encoded in one bit; in the general case, the area requirement will be lower. Since a universal circuit must contain the maximum case, however, the exponential growth law would need to be applied.

In this case, it can be considered particularly advantageous to divide the circuit which holds the sequential circuit into three specific sections/stages. In this regard, a (re)configurable circuit is shown below which is able to provide switching functions having a large number of input variables and a large number of output variables as a sequential circuit.

To design a reconfigurable sequential circuit for logic functions, initial consideration is given to two options:

firstly, it is possible to store a logic function entirely in a RAM store. The input variables for the logic function form the address bits and address a memory cell for every possible combination of input variables. The content of this memory cell then corresponds to the value of the logic function, and the data lines in the memory element form the output variables for the function. The advantage of this concept is the simple design of the circuit, the simple reconfigurability, the large scale of integration for memory elements and the fixed length of time which is required for evaluating the logic function. However, the number of memory cells required, that is to say the size of the memory element required, rises exponentially with the number of input variables. For this reason, only small logic functions can be mapped in this way.

This is prior art in PLDs and is used as a look-up table structure in FPGAs, usually with 4 binary-value input variables and 1 binary-value output.

A second option for mapping logic functions into a combinational circuit is to arrange gates in a two-stage or multistage network in configurable fashion. This allows logic functions to be mapped into combinational circuits with minimal use of gates. In this case, the circuit theory provides beneficial representational forms of logic functions, such as the Reed-Muller form, or else powerful algorithms for minimizing logic. The advantage of this approach is the minimal use of gates and the possibility of using powerful methods and algorithms for the purpose of minimization (cf. literature citations [2] and [3]). This method can easily be used to represent a fixed logic function, e.g. in the implementation of a ROM. Hardware chips such as crossbar switches can be used to connect up the individual gates in reconfigurable form, but in this case the expense for reconfigurability increases exponentially with the number of input variables for the logic function.

5. EXPLANATION OF THE INVENTION WITH THE AID OF A SPECIFIC EXEMPLARY EMBODIMENT

To be able to link the advantages of the first option, the high level of integratability, the reconfigurability and the simplicity of the circuit, and the advantages of the 2nd variant, the little use of gate functions and the ability to use modern methods, the invention provides for the following approach:

The basic idea of the embodiment which is assumed is the development of a reconfigurable sequential circuit which represents as much logic functionality as possible in RAM chips in order to use the advantage of the high level of integration. These RAM chips are intended to be connected to one another in a multistage circuit in reconfigurable form so as not to have to store complete logic functions.

1st Stage:

The input variables for the logic function are represented by the input lines of the combinational circuit. The first stage of the circuit comprises a plurality of parallel-connected memory elements which are addressed by the input lines. In this case, each memory element has an associated subset of the input lines and hence of the input variables for the logic function. The implicants of a logic function (minimized $z_i$ from equation (2) or its string term representation) which are ascertained through minimization methods are stored in memory elements of the input stage. To this end, each memory element having associated input variables tied in the implicant is used to store the usage of the input variables in the implicant and a unique identifier for this implicant. Since each chip has only an associated portion of the input variables, only one respective subimplicant is also stored. That is to say that in the inventive architecture it is necessary to store special, unique identifiers for original implicants in a first memory area, these identifiers addressing subsequent areas. Such identifiers are therefore recognition means or identification means, which is synonymous with bit combinations in the case of the computer architecture. Memory elements which have no associated variables tied in the implicant are accordingly not used to store a portion of the implicant. If there is a bit combination applied to the input lines of the combinational circuit, all the memory elements which contain subimplicants suitable for bit combination forward their identifiers to the 2nd stage of the circuit via the data lines.

2nd Stage:

The identifiers of the (sub)implicants address a memory in a second stage. This memory stores the identifiers' bit patterns associated with the respective implicant and the output values from the logic function. If the bit pattern of identifiers which are provided by the first stage corresponds to that of a stored implicant then this implicant is connected to the input lines of the circuit. The 2nd stage of the circuit then forwards the output values from all the implicants which are connected to input lines to the 3rd stage via the data lines.

3rd Stage:

The 3rd stage subjects the output values from the individual implicants to disjunctive logic combination (ORing) and in this way these output values form the result of the logic function.

Figure 3:
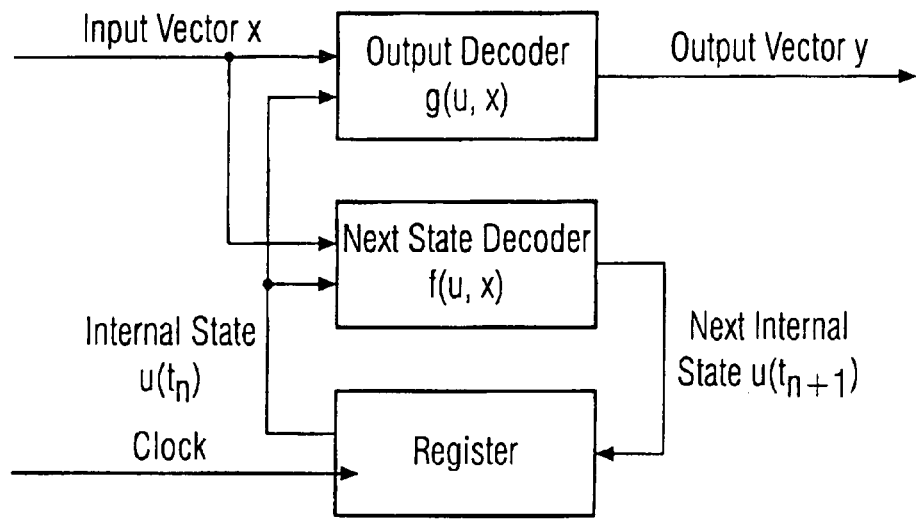
Figure 4:
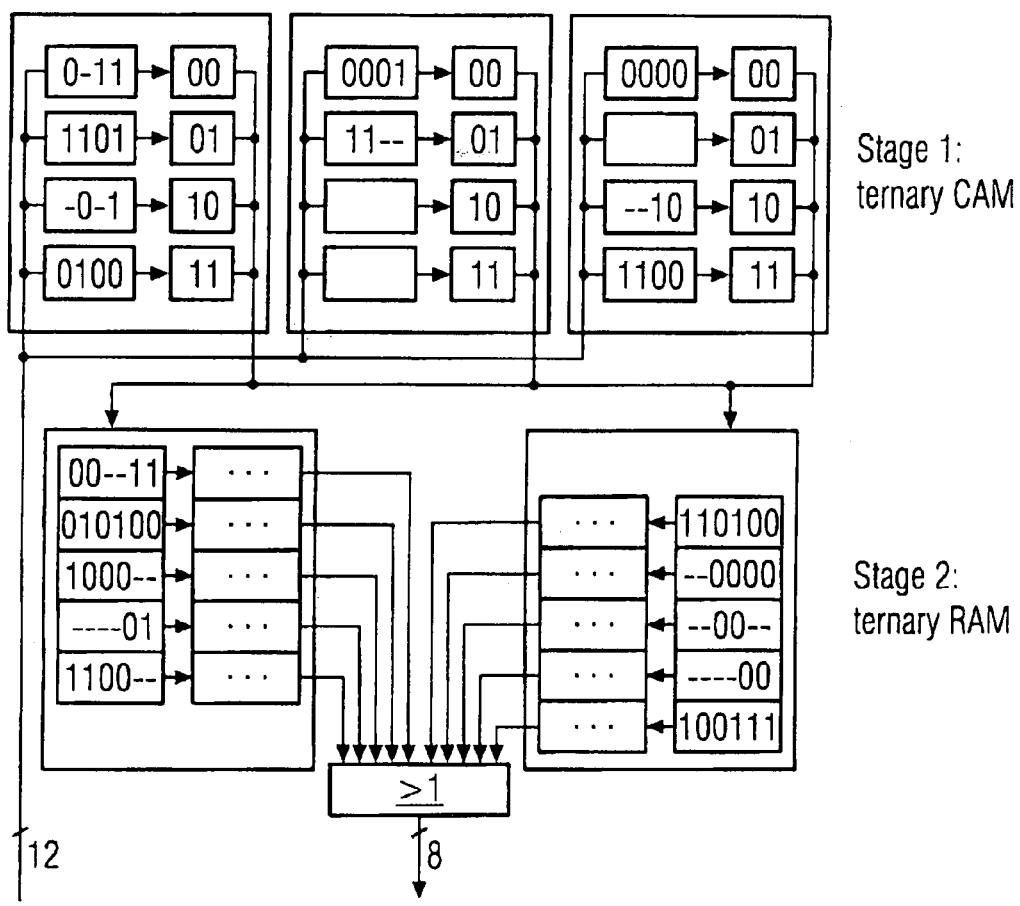
Figures 5A, 5B, 5C:
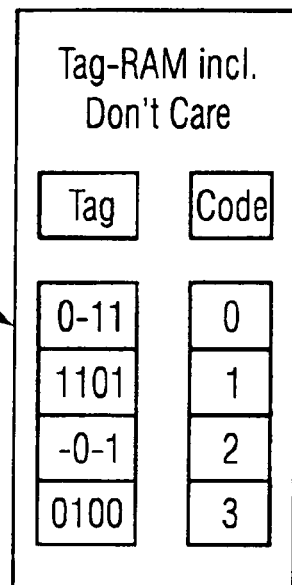
Figure 6:
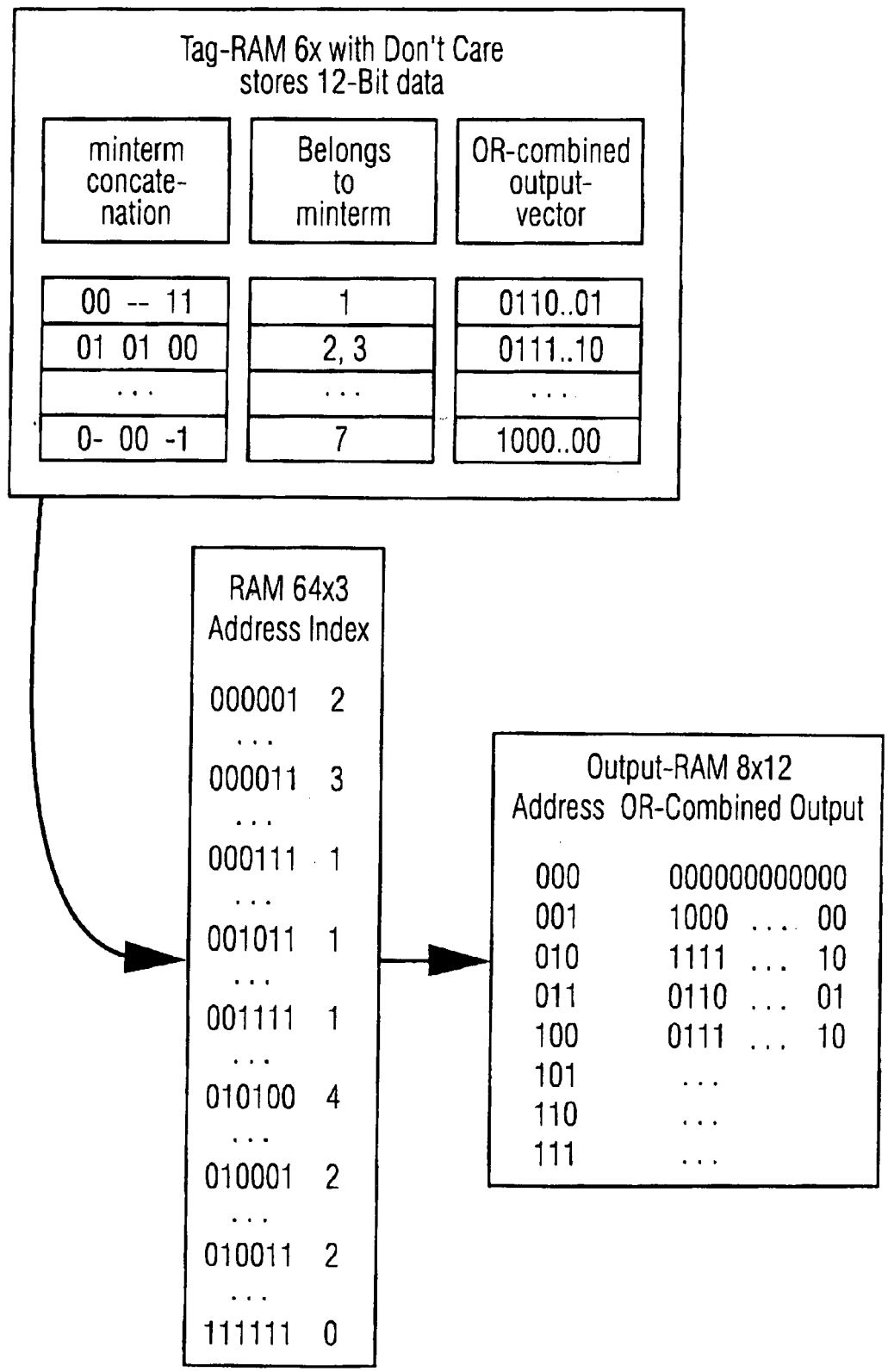
Figure 7:
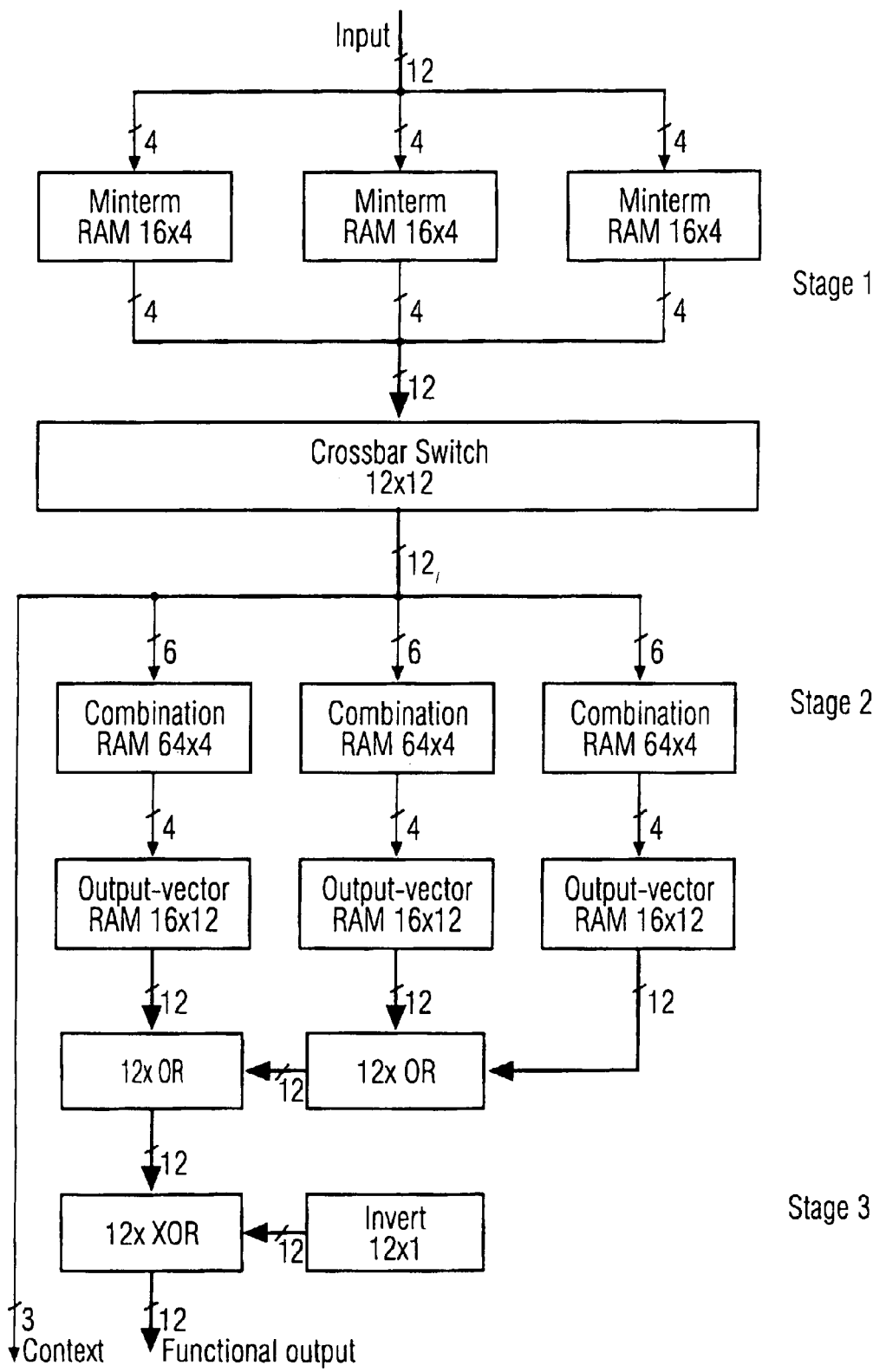
Figure 8:
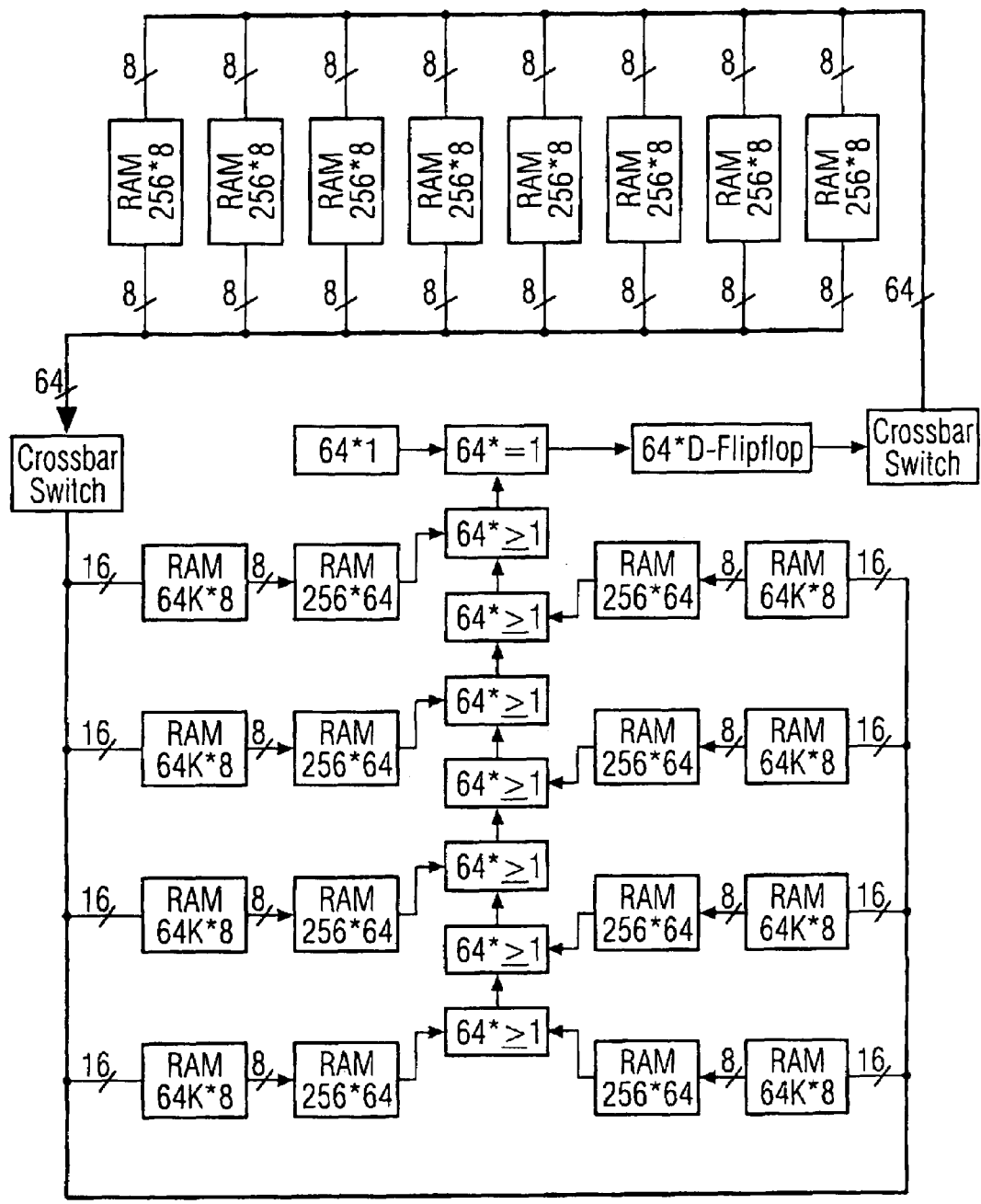
Figure 9:
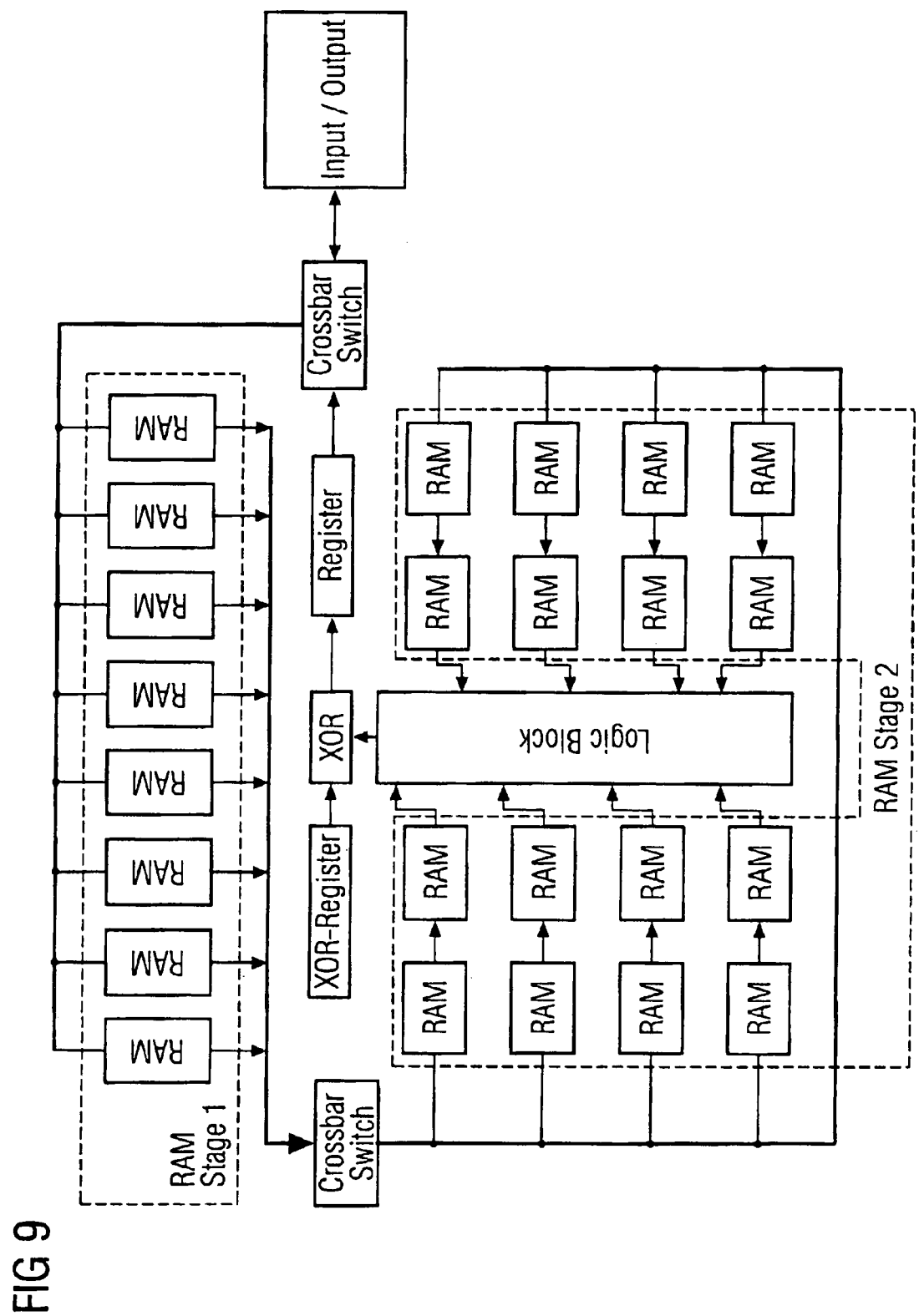

The invention is explained in even more detail below with reference to the drawing using a specific exemplary embodiment and taking into account the considerations above. The drawing comprises the following parts, with FIGS. 1 to 3 already having been mentioned in relation to the prior art in section 2:

FIG. 1 shows the basic design of a Von Neumann architecture based on the prior art, FIG. 2 shows the general structure of a PLD based on the prior art, FIG. 3 shows the basic design of an FSM in the form of a Mealy machine based on the prior art, FIG. 4 shows an exemplary embodiment of a memory design in an architecture based on the invention, FIGS. 5a, 5b and 5c show the mapping of string terms onto RAM, with figure element a) illustrating partial string terms, figure element b) illustrating mapping onto a tag RAM, and figure element c) illustrating mapping onto a conventional RAM, FIG. 6 shows mapping of the result from stage 1 of an architecture based on the invention onto a RAM combination in stage 2, FIG. 7 shows a final architecture for the example $[(0,1)^{12} \rightarrow (0,1)^{12}$ function], FIG. 8 shows an architecture based on the invention for a sequential circuit with a large combinational circuit for holding a GCA, and FIG. 9 shows a reconfigurable architecture based on the invention for holding GCAs.

In this context, corresponding parts have been provided with the same respective reference symbols in the figures.

For the exemplary embodiment shown in FIGS. 4 to 9, an inventive architecture with three stages, as mentioned above, is taken as starting point, specifically for a logic function with 12 input variables, 10 implicants and 8 output variables: table 1 shows all the implicants for this (also called "minterms") for an example function. The representation of the string terms is chosen such that three groups of four are produced in this case.

TABLE 1

Example of an implicant table, shown by string terms
Implicants:

| | |
|---|---|
| 1. | 0-11 ---- 1100 |
| 2. | 1101 11-- 0000 |
| 3. | -0-1 0001 ---- |
| 4. | ---- ---- --10 |
| 5. | 0100 0001 ---- |
| 6. | 0100 11-- 0000 |
| 7. | ---- 0001 0000 |
| 8. | ---- 0001 ---- |
| 9. | ---- ---- 0000 |
| 10. | -0-1 0001 1100 |

If this table is now considered in columns, it will be seen that only a few different combinations arise in the string terms. With binary representation, there could be 2⁴=16 different combinations for each column in this case, and accordingly there could be 3⁴=81 with ternary representation. In the example, only 5, 3 and 4 of these arise for columns 1-3, with an input combination respectively being fully "–".

When a bit combination is applied to the input as a parameter for the logic function, a memory element storing a subimplicant with the applied bit combination returns the identifier for the associated implicant. This memory element in the first stage is shown in FIG. 4 as a ternary CAM, i.e. the input vectors, which are on the address bus realistically as binary information, are compared with stored ternary information. As output, an identifier, likewise ternary, stored for the hit is output.

All identifiers together form the identifier for the implicant combination which is applied to the input of the combinational circuit. In this case, this implicant combination may entirely comprise a plurality of implicants. Thus, the example shown may contain the implicants 3, 4 and 8 or the combination of implicants 4, 5 and 8, for example. In the first case, the bit combination 100001 is applied to the 2nd stage, and in the second case it is the combination 110001.

The identifier for the implicant combinations is recognized in the 2nd stage of the circuit and delivers the associated output value from the logic function for each implicant involved. This second stage now comprises a ternary RAM, i.e. the address bus information in this stage is ternary but the stored data are binary.

The 3rd stage of the circuit subjects the output values from the implicants which are present to disjunctive logic combination and these output values together form the function value of the logic function.

5.1 Stage 1 Memory Elements

As already mentioned, a very specific chip or a very specific architecture, in this case denoted by the ternary CAM as shown in FIG. 4, may be used as memory element for holding the subimplicants. In this context, it is also necessary to discuss the problem of multiple matching in principle, which will be done in connection with other implementation options, however.

Another possible use for stage 1 is a fully associative cache. This is able to store the subimplicants as a "tag", and the cached data item is used as an identifier for the implicant which has been recognized. However, if a subimplicant contains unattached variables which are expressed as Don't Care (DC) points when compared with applied bit combinations then a tag needs to be created in the tag RAM for all instances of this implicant being used which fulfill the comparison with DC. In addition, the comparison with DC produces overlaps between subimplicants. Thus, the bit combination 0011 in the first subimplicant memory in the example above belongs both to implicant 1 and to implicant 3, for example. It is thus possible not just to have combinations of implicants but also combinations of subimplicants.

For this reason, normal, i.e. binary, RAM chips or architectures are used for an implementation as a subimplicant memory. Each of these RAMs is addressed by a portion of the input lines in the combinational circuit. The addresses whose bit combination respectively corresponds to the same subimplicant with DC points (each DC point in a string term signifies that the number of applicable points is increased by the factor 2 in the case of binary coding) are respectively used to store the same identifier in the memory. If the output width of the RAMs used is greater than the bit width which is required for representing the identifiers then the other bits can be used as a context value. This context can indicate an invalid use of the input variables for the logic function, for example.

Since a normal RAM does not have a status indicator for a data item which is not present, such as a tag RAM with its Cache Miss output, a bit combination on those data lines which are used for the 2nd stage for comparing the bit combinations needs to be used as identification for no subimplicants which are present. FIG. 5 c) shows this by the identifier 8.

5.2 Stage 2 Memory Elements

Just as in the RAMs of the first stage for storing the subimplicants, DCs also need to be taken into account when comparing the implicant combinations in the 2nd stage of the circuit. For this reason, a normal RAM is also used in this case. This RAM is addressed with the identifier for the implicant combination.

Since a plurality of addresses are again able to correspond to the same implicant combination, the memory in the second stage needs to be split: the bit combinations in the first stage address a RAM in the second stage. For each valid implicant combination, this RAM stores an index which in turn addresses a RAM which for its part contains the output variables from the implicants involved. Thus, the various addresses produced through implicant combination with Don't Care points can be mapped onto the same index for the output values of the logic function.

FIG. 6 shows relevant mapping of the result from stage 1 onto a RAM combination in stage 2.

5.3 Final Architecture as Shown in FIG. 7

Since a RAM can deliver only a single index, the memory for the output values in a 1st stage of a sequential circuit needs to hold the disjunctively logically combined output values from all the implicants involved in the recognized combination. This means that the output RAM in this stage needs to be able to store all possible function values of the logic function. Since the number of possible function values increases exponentially with the number of output variables for a logic function, a plurality of combination and output memories in the 2nd stage of the sequential circuit are used in parallel and their output combinations are subjected to disjunctive logic combination. This allows all the function values of a logic function to be produced.

To be able to make better use of the capacity of the individual combination memories, all the data lines in the implicant memories are connected to all the address lines in the combination memories via a crossbar switch. This allows any data lines to undertake the addressing of the combination RAMs. Unused data lines can be forwarded via the crossbar switch as context information.

In a final step, the output value produced is logically combined with a register content bit by bit in a 3rd stage of the sequential circuit using the Exclusive-OR function in order to be able to invert individual output variables and thus to obtain smaller logic minimizations if appropriate. The 3rd stage of the circuit therefore comprises the disjunctive logic combination of the output combinations and the subsequent possible inversion of individual output bits.

The overall result is the basic circuit diagram in FIG. 7 for a sequential circuit based on the invention.

5.4 Discussion of the Architecture

It is the intention of the invention to provide both a RAM-based architecture for implementing large combinational circuits and—to a certain extent as an application for holding a universal machine—this architecture for holding GCAs. To hold any desired function in the RAM the memory space in the memory needs to grow exponentially with the number of inputs (and linearly with a number of outputs). In the case of the example above, this means that any desired function with 12 inputs and 12 outputs would have a memory requirement of 4096*12 bits, accordingly 6144 bytes. With 32 inputs and 8 outputs, this would already be 4 Gbytes of storage capacity.

The proposed architecture for a multistage network contains just 211.5 bytes of RAM, namely:

| | |
|---|---|
| 3x implicant RAM 16x4 | 24 bytes |
| 3x combination RAM 64x4 | 96 bytes |
| 3x output RAM 16x12 | 72 bytes |
| Crossbar switch configuration | 18 bytes |
| Inversion 12x1 | 1.5 bytes |
| Total | 211.5 bytes |

The fundamental advantage is therefore that this architecture is much more space-saving than an LUT-based architecture. In this context, it should be taken into account that not every function can be represented in this way.

To be able to map an application into this architecture, it is necessary for a plurality of necessary conditions to be met. The first condition is that the number of different string term elements which are present in a column can be mapped onto the RAMs in the first stage. This is automatically fulfilled by virtue of these RAMs holding all combinations (because they emulate CAMs), and only the input width of the circuit needs to be sufficient for application.

This is followed by the second condition: the number of different string term element combinations which the application contains following minimization needs to be encodeable. This means that a number of memory locations needs to be available. In order to estimate efficiency, let m be the input width of the combinational circuit. This would mean that 2 m memory cells would be needed in order to represent the full function.

If k is now the parallelism of the chips (number of chips) and 2s is the capacity of a chip then it is necessary for the inequality $$k*s \leq m-1 \tag{3}$$

to apply for more efficient storage of the application. The clearer the shortfall turns out to be, the more efficient was the implementation.

Condition 3 means that the output width needs to be chosen suitably.

6. MAPPING GCAS ONTO THE ARCHITECTURE

To map GCAs onto the inventive architecture, it is also necessary to introduce memory elements which store the progression in the calculation under clock control. The reason for this is that GCAs are defined as an array of FSMs, and these are normally synchronized. It is assumed here that a global clock is taken for synchronization. All implementations of non global clocks, particularly those which are not in a reciprocal relationship, would result in significant problems but are rarely encountered in practice.

FIG. 8 shows another example of a configurable architecture of the proposed type, now equipped with registers for storing states. In addition, a further crossbar switch has been added which at this location is used, inter alia, to provide input and output interfaces for the computer. Although this is of no significance to the fundamental understanding of the architecture it is necessary in practical operation because a computer needs to be provided with external connections.

The memory requirement of this exemplary architecture is calculated as follows

| | |
|---|---|
| 8x minterm RAM 256x8 | 2 kbytes |
| 8x combination RAM 64Kx8 | 512 kbytes |
| 8x output vector RAM 256x64 | 16 kbytes |
| 2 x crossbar switch configuration | 1 kbytes |
| Inverting register 64x1 | 8 bytes |
| Sum | 531 kbytes |

This explains how low the memory requirements are: a RAM with 264*64 bits (=267 bytes) is not possible in production at any rate. If lines from the RAMs in the first stage are meant to remain unused in the case of an application on this architecture, they can be used as context information. In this case, an application is the context switching which might additionally be possible for the RAMs in the second stage. If only 14 address bits are thus required for a RAM, for example, the information can be stored four times for these 14 bits, that is to say can be in four different contexts.

FIG. 9 shows the basic design of a reconfigurable architecture based on the invention, as is suitable for holding GCAs. This design is a generalization of the design from FIG. 8. In particular, the RAM stages 1 and 2 are illustrated by dashed lines.

7. LITERATURE CITATIONS

[1] Rolf Hoffmann, Klaus-Peter Völkmann, Wolfgang Heenes: "Globaler Zellularautomat (GCA): Ein neues massivparalleles Berechnungsmodell" [Global Cellular Automaton (GCA): A new massively parallel computation model], Information—Gesellschaft für Informatik e.V., Parallel Algorithms and Computer Structures, ISSN 0177-0454 No. 18, 2001, pages 21-28; http://www.ra.informatik.tu-darmstadt.de/publikationen/publik.html
[2] R. K. Brayton et al.: "Logic Minimization Algorithms for VLSI Synthesis", Kluwer Academic Publishers, USA 1984.
[3] Mike Trapp: "PLD-design methods migrate existing designs to high-capacity devices", EDN Access, February 1994; http://www.reed-electronics.com/ednmag/archives/1994/021794/04dfl.htm
[4] Wolfgang Heenes, Rolf Hoffmann, Klaus-Peter Völkmann: "Architekturen für den globalen Zellularautomaten" [Architectures for global cellular automata] 19th PARS Workshop, Mar. 19-21, 2003 Basle; http://www.ra.informatik.tu-darmstadt.de/publikationen/pars03.pdf

The invention claimed is:

1. A reconfigurable architecture for a computer device having at least one individually configurable and/or reconfigurable sequential circuit which has a first stage with inputs and is formed from a plurality of parallel-connected memory elements which can be addressed via input lines, each memory element being able to be supplied with a subset of input variables attached to an associated, ascertained implicant, has a second stage, connected downstream of the first stage, with memory elements which can be addressed by identifiers of the individual implicants, and has a third stage, connected downstream of the second stage, with outputs and with means for disjunctive logic combination of output values from the individual implicants from the memory elements in the second stage, where output variables from at least some of the outputs at a time $t_{n-1}$ form the input variables on associated inputs of the sequential circuit at a time $t_n$ and where means are provided for clock-controlled storage of the output variables from the sequential circuit between the times $t_{n-1}$ and $t_n$.

2. The architecture as claimed in claim 1, characterized in that the storage means are register memory elements.

3. The architecture as claimed in claim 1, characterized by implicants ascertained using minimization methods.

4. The architecture as claimed in claim 2, characterized by implicants ascertained using minimization methods.

5. The architecture as claimed in claim 1, characterized in that the first stage is logically combined with the second stage by means of at least one crossbar switch.

6. The architecture as claimed in claim 1, characterized by CAMs and/or RAMs as memory elements.

7. The architecture as claimed in claim 1, characterized by implementation of at least one GCA.

8. The architecture as claimed in claim 1, characterized by magnetoresistive memory elements, particularly of the TMR type.

* * * * *